Nov. 18, 1952 — P. Z. ANDERSON ET AL — 2,618,520
BEARING MOUNTING
Filed June 6, 1950
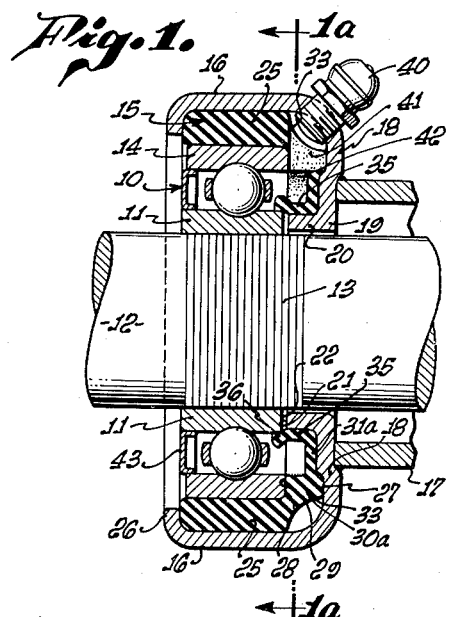
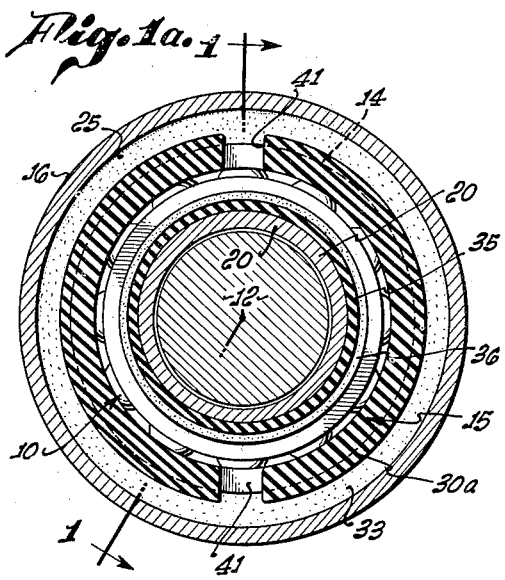
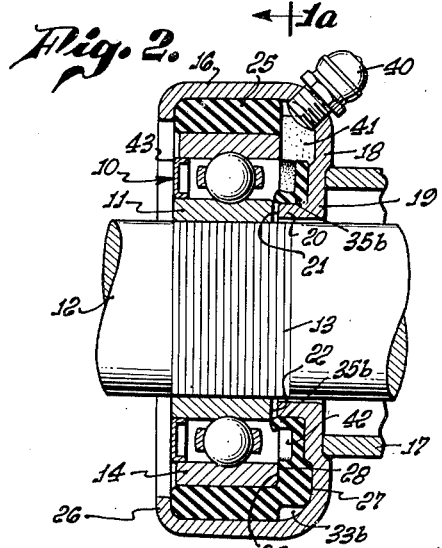
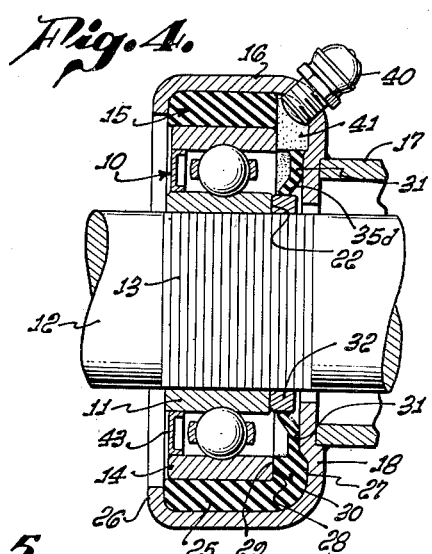
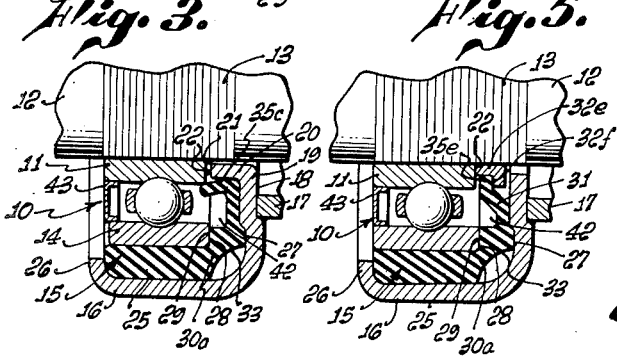
PAUL Z. ANDERSON,
HENRY O. FUCHS,
INVENTORS.
BY Buckelew & Faulkebury
ATTORNEYS.

Patented Nov. 18, 1952

2,618,520

UNITED STATES PATENT OFFICE 2,618,520

BEARING MOUNTING

Paul Z. Anderson, Whittier, and Henry O. Fuchs, Los Angeles, Calif., assignors to Preco Incorporated, Los Angeles, Calif., a corporation of California Application June 6, 1950, Serial No. 166,492

6 Claims. (Cl. 308—184)

This invention relates to mountings for bearings, and/or to mounted bearings, particularly of the ball bearing type. Radial bearings of that type are peculiarly subject to damage if subjected to end thrusts involving forces applied in opposite directions to the two races, which may commonly occur in forcing a bearing onto or off a shaft or into or out of an exterior housing. Bearings of other types may also be subject to such damage, but as radial ball bearings are peculiarly susceptible, the invention will be explained with those in mind, but without necessary limitation thereto.

Also the invention will be explained specifically in an illustrative form which provides a structure in which the inner one of the two members on which the bearing is mounted can be forced into or out of the inner bearing race without damage, but without implying necessary limitation of the invention. Any such bearing is mounted on two members, the inner race or equivalent bearing member being mounted on an inner mounting member or shaft, the outer race or equivalent member in what may be called a housing. Either the inner shaft or equivalent, or the outer housing, or both, may be rotative in the mechanism of which the bearing and its mounting form a part. The invention provides on one of those mounting members a contact portion having normal clearance from but adapted, on application of relative end thrust to either mounting member, to contact the bearing race which is mounted on that other member. In order to maintain normal clearance but to allow contact under end thrust, the other bearing race is flexibly mounted on that mounting member which carries the contact portion. Such flexible mounting is preferably provided through the use of grommets of rubber or rubber-like material which also are formed in such manner as to give the bearing angular flexibility in its mounting, and seal the bearing for retention of lubricant and exclusion of dirt.

The following detailed explanation of present preferred embodiments of the invention will be directed to specific forms in which the outer bearing race is flexibly mounted in the housing (the outer mounting member), and in which the outer housing is provided with the part that, on application of end thrust, engages the inner race which is mounted on the shaft; thus providing for forcible insertion or removal of the shaft without bearing injury.

Reference is had to the accompanying drawings in which the several figures, 1 to 5 inclusive, are longitudinal sections (Figs. 3 and 5, fragmentary) showing various detail modifications; and Fig. 1a is a transverse section on line 1a—1a of Fig. 1. The longitudinal sections are taken as indicated by line 1—1 on Fig. 2.

Referring first to Fig. 1, a typical radial ball bearing 10 is shown with its inner race 11 mounted on a shaft 12. 13 indicates a knurled portion of the shaft, providing in effect a localized shaft portion of slightly increased diameter over which inner race 11 is force fitted. Insofar as the present invention is concerned that localized force-fitting provision is merely illustrative of any shaft-and-race assembly which requires end thrust for assembly or disassembly of the member (shaft in this case) and the bearing race. The member here called the shaft may be any equivalent inner mounting member, whether or not rotatable.

The outer bearing race 14 is shown as mounted, through the medium of a distortible tubular grommet 15, in an outer housing 16. That housing, rotative or non-rotative, may be mounted on, or form a part of, any machine or other structure. As here illustratively shown, it is mounted on a tube 17 through which shaft 12 extends, for instance to another similarly mounted bearing at the opposite end of the tube. As here illustratively shown, housing 16, generally tubular in form, has at one end a closure flange 18 to which the end of tube 17 is welded. The inner periphery 19 of flange 18 fits around shaft 12 with a suitably small clearance, and at that inner periphery the housing flange carries a tubular inward projection or flange 20 whose inner end face 21 normally lies closely axially spaced from the opposing inner end face 22 of the inner, shaft-mounted, bearing race 11. The inner bearing race is carried in that normal spaced position by reason of the outer race 14 being carried, by grommet 15, in a definite normal axial position with reference to the housing, and because the two races are held in definite relation by the balls.

In the particular form shown in Figs. 1 and 1a, the main body 25 of the rubber-like grommet 15 is generally tubular in form, fits closely about outer race 14, and is compressedly fitted into housing 16 inside a retaining lip 26 on the outer open housing end. The lip preferably overhangs the grommet sufficiently to prevent extrusion of the rubber between the housing and the outer bearing race. End shoulder 27 of the grommet contacts the inner face of housing flange 18, and the inner end surface 28 of outer race 14 bears against an opposite face 29 of the grommet, so that the grommet material between 27 and 29 is put under compression, or more than normal compression, if the outer race is forced into the housing any further than shown. In initially forcing the outer race and grommet body into the housing suitable tools may be used to force those parts in just far enough that, on release of the forcing pressure, the equilibrium position of the outer and inner races is as shown with the grommet body and the portion between 27 and 29 under no substantial stress. Or the grommet as a whole may, in its normal set position, be under some longitudinal compression between lip 26 and housing flange 18. In either of such cases, the equilibrium position in which the outer race 14 is held by the grommet may be such, with relation to the inner race, that no substantial axial load is transmitted through the balls to the inner race. On the other hand the normal setting of the bearing and grommet with relation to the housing and shaft may be such that, assuming the shaft is held against relative movement toward the left in the figures (as by another such bearing and mounting at the right hand end of the shaft), the portion of the grommet body between 27 and 29 is normally held under some compressive stress, with the reaction to that stress transmitted through the bearing to the shaft. That initial stress will prevent the inner race from striking surface 21 under moderate axial loads. Slightly higher loads are then necessary to bring the inner race into contact with 21 for bearing removal, but those loads are still well below the axial load which might damage the bearing.

Various detailed forms of the grommet are shown in the several figures. In Fig. 4, for instance, a simple form is shown in which the grommet body 25 has an inturned flange 30 on its inner end, that flange 30 lying between race end face 28 and the inner face of housing flange 18. In this form the grommet, at the junction of body 25 and flange 30, fills the internal corner of the housing between its body 16 and flange 18. Inward of the relatively thick flange 30, the form of Fig. 4 has a relatively thin and flexible flange extension 31 with a conical inner lip formation adapted either to contact or closely surround a special collar 32 which, fitted on shaft 12 at the inner end of inner race 11, may be considered either as an effective extension of the inner race or as a part of the housing. The details of this, and other differences between Fig. 4 and Fig. 1 will be explained later.

In Fig. 1, the corner portion of the grommet is cut away, as at 33 at the corner junction of grommet body 15 and the flange 30a whose opposite faces provide the faces 27 and 29. The relatively thin flange 31a which extends inwardly from flange 30a has a cylindric flange portion 35 at its inner edge fitting around the housing flange 20. The flexible inner end of 35 either contacts or closely approaches the inner end or inner end corner of inner race 11. As shown in Fig. 1, the inner end of 35 is flared at 36 and forms a flexible lip flange which contacts the race corner.

To provide for lubrication the housing has a lubricant fitting 40 that discharges into an opening 41 formed through the grommet at its corner. Introduced lubricant thus passes through opening 41 into the annular space 42 which lies adjacent the thin grommet flange 31a inside the inner edge of the thicker flange 30a and which communicates directly with the ball annulus between the two races. The grommet with its lip flange 35, 36 seals the inner end of the bearing against lubricant leakage and dirt entry. The outer end of the bearing may be sealed in any desired manner, as by the usual sealing flange 43.

The grommet may have either one, or two or more of the lubricant passages 41 distributed around its corner periphery to facilitate registry with the lubricant fitting and to aid in lubricant distribution. Lubricant introduced at the fitting may move around through the annular open space 33 and thence into annular space 42 through another opening 41. Fig. 1a shows two such openings diametrically spaced. For clarity in showing the sectional conformation of the grommet, however, Fig. 1 and other similar sections show only one of the openings.

When shaft 12 is forced, relative to housing 16, toward the right in the aspect of Fig. 1, the distortible grommet distorts sufficiently, under a relatively low forcing pressure, to allow race face 22 to seat on housing face 21. Once the inner face is thus seated any reasonable amount of forcing pressure may be applied to insert or remove the shaft without any possibility of injury to the bearing. In the form of Fig. 1, the grommet body 25 distorts in shear, while the grommet flange 30a distorts in compression. The distortion action in Fig. 4 is substantially the same, except that the absence of grommet material in space 33 in Fig. 1 somewhat decreases the section of material that acts in compression; so that the force which will seat the inner race is less in Fig. 1 than in Fig. 4. However, in either case, using medium-soft rubber or rubber-like materials such as "Buna-N" or neoprene in distortible sections of about the relative dimensions illustrated, the bearing is normally held in the illustrated normal position but the force required to seat the inner race is small enough to fully protect the bearing from injury. The normal clearance between the inner race and seating face 21 may be very small—of the order of a few thousandths of an inch for a bearing such as illustrated and of say one inch shaft diameter. However, a somewhat larger normal clearance, say about thirty thousandths or more, is fully practicable and preferred. One of the general features of bearings mounted in distortible material is the allowance of bearing accommodation to mis-alinements of the mountings. And a fairly large normal clearance at 21, 22 also allows for that. That fairly large normal clearance at 21, 22 is of course substantially smaller than the corresponding axial clearance between the end of the outer race 14 and the housing flange 18 (or any other rigid part of the housing) so that 21 will contact 22 before the end of the outer race can contact the housing, or before relative longitudinal movement of the outer race can put the rubber between 27 and 29 under such compression as to be likely to injure the bearing.

In Fig. 2, the structure is the same as in Figs. 1 and 1a, and the same numerals are applied, except for the following modifications. The corner relief 33b is relatively slight. And the flexible lip-flange 35b engages or closely approaches the inner race 11 endwise at or near the end corner of the race, or just slightly overlaps that end corner.

In Fig. 3, the structure is the same as in Figs. 1 and 1a, and the same numerals are applied, excepting that flexible lip flange 35c, bearing on or approaching the inner end corner of inner race 11, is wholly flared or conical instead of flared only at its end.

Fig. 4, as before noted, shows an arrangement in which, instead of providing mounting flange 18 with the inwardly turned contact flange 20 of Figs. 1, 2 and 3, a separate abutment member is provided between inner race 11 and mounting flange 18, in the form of a collar 32. Preferably the collar is tightly fitted to the shaft against the inner race, being forced on the shaft by the same operation and along with race 11. The normal clearance space is then between that collar and the inner face of housing flange 18. The collar can thus be regarded as an extension of race 11.

On the other hand, the collar can slidingly, but preferably closely, fit the shaft; in which case the normal clearance may be between it and either flange 18 or the race 11. In that case the collar may be regarded as an extension or part of either the flange 18 or the race 11. Consequently wherever herein or in the claims the normal clearance between a part of a mounting member and a race is spoken of, it is meant to include not only a clearance between direct or integral parts of those elements but also a clearance between either of those elements and a part, such as 32, which functions as a filler between them.

Fig. 4 also shows another variation. The flange 31 has at its inner edge a conical lip flange 35d which, instead of contacting race 11 directly, contacts or fits closely around the outer periphery of collar 32.

Fig. 5 shows another variation in the type of assembly shown in Fig. 4. Here in Fig. 5, collar 32e (to which the same remarks apply as to collar 32 in Fig. 4) is provided with an inwardly facing shoulder 32f (that is, a shoulder facing toward the bearing and toward the lubricant space 42). And the thin flange 31 is provided with an inward extension lip 35e which bears outwardly against shoulder 32f. In this form, lubricant pressure in the space 42 tends to press lip 35e against collar shoulder 32f to form an effective lubricant seal. And it will be noted that the same sealing action is true of the several different forms of lips 35 or 36 shown in the other figures. In Fig. 1 the lip 36 faces away from space 42 against the corner of the inner race. In Fig. 2 flange 35b has substantially the same relation. In Fig. 3 the same relation is true of flange 35c; and in Fig. 4 flange 35d faces in the same relative direction against the outer face of 32.

We claim:

1. In combination with a bearing which embodies inner and outer relatively rotatable elements coupled to prevent relative axial movement between them, a mounting comprising inner and outer mounting members on which the respective inner and outer bearing elements are mounted, one of said bearing elements being tightly fitted to its corresponding one of the mounting members and removable therefrom by axially exerted pressure, a resiliently distortible bushing through which the other bearing element is carried by its corresponding other one of the mounting members, said bushing allowing resiliently opposed movement of said other bearing element axially with relation to said other mounting member and normally holding said other bearing element in a normal position with reference to said other mounting member, and said other mounting member having a rigid part which lies in a position axially opposed to, and axially spaced by an open spacing from, the first mentioned one bearing element and adapted to be directly and solidly contacted by said one element upon its axial movement relative to said other mounting member in one direction, said open axial spacing being substantially less than the corresponding axial spacing of the said other bearing element from any rigid part of its said other mounting member.

2. In combination with a shaft-carrying bearing of the radial ball-bearing type which includes inner and outer races; said mounting comprising a housing, a bushing of resiliently distortible material within the housing and surrounding and supporting the outer bearing race in a normal position but allowing resiliently opposed axial movement of the bearing with relation to the housing, and said housing having a rigid part which normally lies in a position axially opposed to, and spaced by an open space axially from, the inner bearing race and adapted to be directly and solidly contacted by that race on its axial movement in one direction, said open axial spacing being substantially less than the corresponding axial spacing of the outer bearing race from any rigid part of the housing.

3. In combination with a shaft-carrying bearing of the radial ball bearing type which includes inner and outer races, the inner race carrying the shaft; a mounting comprising a housing having a tubular body surrounding the outer race, a bushing of resiliently distortible material within the housing body and surrounding and supporting the outer race in a normal position but allowing resiliently opposed axial movement of the bearing with relation to the housing, said housing body having a rigid inwardly extending flange at one end surrounding the carried shaft, and said flange having a part which normally lies in a position axially opposed to, and spaced by an open space axially from the inner race and adapted to be directly and solidly contacted by that race on axial movement in one direction, said open axial spacing being substantially less than the corresponding axial spacing of the outer bearing race from any rigid part of the housing.

4. The combination defined in claim 3, wherein the mounting also includes a flange extension of the resilient bushing lying against the inner face of the mounting flange and between that face and an end of the outer race.

5. The combination defined in claim 3, wherein the mounting also includes a flange extension of the resilient bushing lying against the inner face of the mounting flange and between that face and an end of the outer race, and a thin flexible lip extension of said bushing flange adapted to contact the adjacent end portion of the inner race.

6. The combination defined in claim 3, wherein the mounting also includes a flange extension of the resilient bushing lying against the inner face of the mounting flange and between that face and an end of the outer race, and a thin flexible lip extension of said bushing flange adapted to contact the adjacent end portion of the inner race, said thin extension also lying against the inner face of the mounting flange and spaced in part axially from the adjacent end of the bearing to form a lubricant chamber between it and the bearing.

PAUL Z. ANDERSON.
HENRY O. FUCHS.

REFERENCES CITED

The following references are of record in the file of this patent:

UNITED STATES PATENTS

| Number | Name | Date |
| --- | --- | --- |
| 2,173,250 | Fay | Sept. 19, 1929 |
| 2,251,228 | Leister | July 29, 1941 |